US012631112B2

(12) United States Patent
Vest et al.

(10) Patent No.: US 12,631,112 B2
(45) Date of Patent: May 19, 2026

(54) SYSTEM AND METHOD FOR OVERHAULING A TURBINE COMPONENT

(71) Applicant: Chromalloy Gas Turbine LLC, Palm Beach Gardens, FL (US)

(72) Inventors: Alexander Lawrence Vest, Palm Beach Gardens, FL (US); Cassandra Vianne Thibeault, Palm Beach Gardens, FL (US); Michael Patrick Davis, Palm Beach Gardens, FL (US); Logan Sterling Allen, Palm Beach Gardens, FL (US)

(73) Assignee: CHROMALLOY GAS TURBINE LLC, Palm Beach Gardens, FL (US)

( * ) Notice: Subject to any disclaimer, the term of this patent is extended or adjusted under 35 U.S.C. 154(b) by 0 days.

(21) Appl. No.: 18/925,163

(22) Filed: Oct. 24, 2024

(65) Prior Publication Data

US 2026/0117655 A1 Apr. 30, 2026

(51) Int. Cl.
*F01D 5/12* (2006.01)
*F01D 9/02* (2006.01)

(52) U.S. Cl.
CPC ................ *F01D 5/12* (2013.01); *F01D 9/02* (2013.01); *F05D 2220/32* (2013.01); *F05D 2230/70* (2013.01); *F05D 2230/80* (2013.01)

(58) Field of Classification Search
CPC ..... F01D 5/12; F01D 5/00; F01D 9/02; F01D 9/00; F01D 15/06; F01D 15/00; F05D 2220/32; F05D 2220/30; F05D 2220/00; F05D 2230/70; F05D 2230/00; F05D 2230/80
See application file for complete search history.

(56) References Cited

U.S. PATENT DOCUMENTS 5,560,841 A * 10/1996 DeMichael ............ B23K 11/22 228/264
12,338,749 B2 * 6/2025 Hafner .................... F01D 5/189
2010/0155224 A1 * 6/2010 Belousov ................ C23C 14/32 204/298.03

(Continued)

FOREIGN PATENT DOCUMENTS

CA 2905106 A1 9/2014
CN 115430737 A 12/2022
NL 2007313 A 3/2012

OTHER PUBLICATIONS

European Search report dated Mar. 17, 2026, received in EP Application No. 25209278.8, 8 pp.

*Primary Examiner* — Lawrence Averick
(74) *Attorney, Agent, or Firm* — NIXON & VANDERHYE, PC

(57) ABSTRACT

A separation tool is configured to extract an end cap from a main body of a turbine component. The separation tool includes a first body with a first base and a first holding portion that projects from the base and a second body with a second base and a second holding portion. The first and second bodies are separable from each other and are configured to form a contoured gap when the first and second bodies are positioned against each other in a side-by-side configuration. In addition, the first and second bodies are configured so that when the first and second bodies are brought together, a first side wall of the gap is convex and a second side wall of the gap opposing the first side wall is concave.

20 Claims, 6 Drawing Sheets

(56) References Cited

U.S. PATENT DOCUMENTS

| | | | | |
|---|---|---|---|---|
| 2014/0259662 | A1* | 9/2014 | Nguyen-Dinh ....... | F01D 25/285<br>29/888 |
| 2016/0090851 | A1* | 3/2016 | Carr ...................... | F01D 25/246<br>29/889.22 |
| 2016/0177749 | A1* | 6/2016 | Brandl .................. | F01D 5/3023<br>416/219 R |
| 2023/0059995 | A1* | 2/2023 | Geertsema .............. | F01D 25/04 |
| 2024/0026795 | A1* | 1/2024 | Hafner .................... | F01D 5/188 |

* cited by examiner

SYSTEM AND METHOD FOR OVERHAULING A TURBINE COMPONENT

TECHNICAL FIELD

The technology relates to a system and method for overhauling a turbine component for repair. In particular, the technology relates to the removal of an end cap and associated urethane from a turbine component.

BACKGROUND

Turbine components, such as turbine blades (also referred to as airfoils) or vanes, in a gas turbine system are typically subjected to stress from centrifugal force and fluid forces that can cause fracture, yielding, or creep failures. In addition, turbine components often endure temperatures around 2,500° F. (1,370° C.). Such high temperatures can weaken the turbine components and make them more susceptible to creep and corrosion failures. Also, vibrations from the turbine itself can cause fatigue failures.

The end caps that are attached to the blades or vanes and the urethane that bonds the end caps to the blades or vanes are particularly susceptible to structural damage. Accordingly, the turbine components are periodically inspected. When damage is observed on the end caps and/or the urethane, the end cap and urethane are removed from the blade or vane.

In a current method for removing the end cap and urethane from the turbine component, a saw is used to cut off the end cap from the rest of the turbine component. Alternatively, the end cap is subjected to heat, and then the end cap is pried off of the turbine component. Once the end cap has been removed from the turbine component, the remaining urethane is cut and/or buffed off of the turbine component. However, the current method is labor intensive and often damages the turbine component itself.

SUMMARY

Disclosed herein are a system and method that may be applied to solve the problems discussed above.

In one aspect of the technology, a separation tool configured to extract an end cap from a main body of a turbine component includes a first body with a first base and a first holding portion that projects from the first base; and a second body with a second base and a second holding portion, wherein the first and second bodies are separable from each other and are configured to form a contoured gap when the first and second bodies are positioned against each other in a side-by-side configuration, wherein the first and second bodies are configured so that when the first and second bodies are brought together, a first side wall of the gap is convex and a second side wall of the gap opposing the first side wall is concave.

A further aspect of the technology includes the preceding aspect and wherein the gap comprises one or more regions in which the gap is wider than in other regions.

A further aspect of the technology includes any of the preceding aspects and wherein at least a portion of an upper surface of the first holding portion and at least a portion of an upper surface of the second holding portion are inclined in the same direction when the first and second bodies are positioned against each other in the side-by-side configuration.

A further aspect of the technology includes any of the preceding aspects and wherein the first base has a larger footprint than the first holding portion and forms a lip or flange around the first holding portion.

A further aspect of the technology includes any of the preceding aspects and wherein the second base has a larger footprint than the second holding portion and forms a lip or flange around the second holding portion.

A further aspect of the technology includes any of the preceding aspects and wherein the first holding portion comprises a first contoured substantially vertical wall, the second holding portion comprises a second contoured substantially vertical wall, and the first and second contoured substantially vertical walls are configured to face each other to form the gap when the first and second bodies are brought together in the side-by-side configuration.

In a further aspect of the technology, an extraction device is configured to extract a main body of a turbine component from an end cap and includes an actuator; an one or more extractors attached to the actuator; and a separation tool according to any of the preceding aspects.

A further aspect of the technology includes the preceding aspect and wherein the actuator is configured to move the one or more extractors toward the separation tool so that the one or more extractors applies a downward force against the main body of the turbine component while the separation tool prevents the end cap from moving downward.

A further aspect of the technology includes any of the preceding aspects and wherein the first body of the separation tool is laterally movable toward and away from the second body of the separation tool, while the second body of the separation tool is anchored to a frame of the extraction device.

A further aspect of the technology includes any of the preceding aspects and further includes a rod configured to move the first body of the separation tool toward and away from the second body of the separation tool.

In a further aspect of the technology, a method for extracting a main body of a turbine component from an end cap includes loading the turbine component onto a separation tool; moving an one or more extractors component toward the separation tool; and applying the one or more extractors component against the main body of the turbine component to push the main body in a first direction while preventing the end cap from moving in the first direction so that the main body of the turbine component separates from the end cap.

A further aspect of the technology includes the preceding aspect and wherein the first direction is a downward direction.

A further aspect of the technology includes any of the preceding aspects and wherein the turbine component is held by the separation tool so that the main body is oriented in a vertical direction.

A further aspect of the technology includes any of the preceding aspects and wherein the separation tool is comprised of a first body that is laterally movable relative to the one or more extractors component and a second body that is fixed relative to the one or more extractors component.

A further aspect of the technology includes any of the preceding aspects and wherein when the turbine component is loaded onto the separation tool, the end cap of the turbine component rests on top of the separation tool, while the main body of the turbine component is positioned between the first and second bodies of the separation tool.

A further aspect of the technology includes any of the preceding aspects and wherein the turbine component is loaded onto the second body of the separation tool prior to the first body of the separation tool being positioned against the second body.

A further aspect of the technology includes any of the preceding aspects and wherein the one or more extractors component is moved through the end cap of the turbine component before coming into contact with the main body of the turbine component.

A further aspect of the technology includes any of the preceding aspects and wherein the one or more extractors component is in the form of a cylinder.

A further aspect of the technology includes any of the preceding aspects and wherein the first and second bodies of the separation tool respectively comprise convex and concave walls that engage the main body of the turbine component.

A further aspect of the technology includes any of the preceding aspects and wherein the first and second bodies of the separation tool comprise inclined upper surfaces that engage the end cap of the turbine component.

DETAILED DESCRIPTION OF EXAMPLE NON-LIMITING EMBODIMENTS

Figure 1:
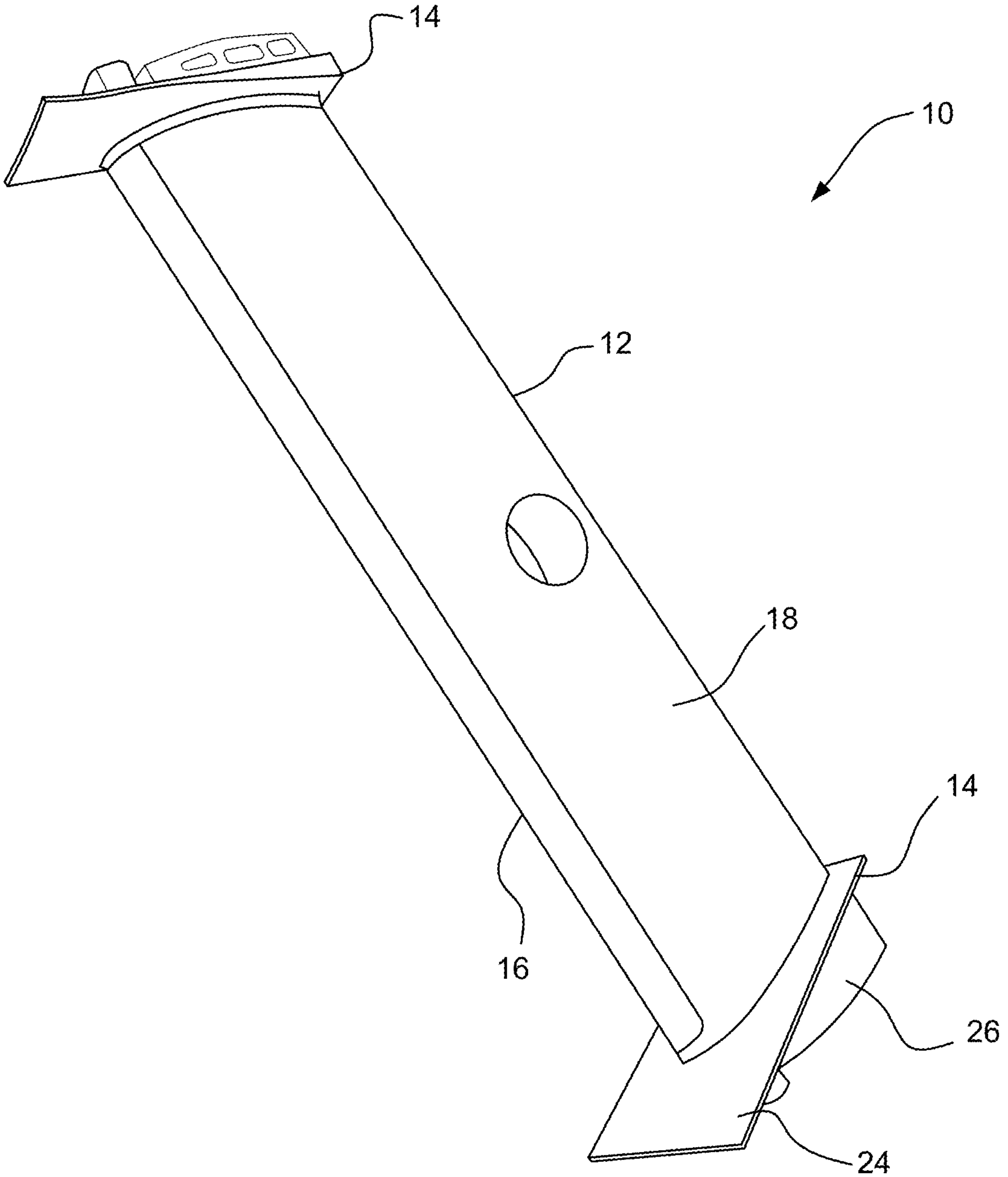
FIGS. 1 and 2 illustrate perspective views of an exemplary turbine component.
Figure 2:
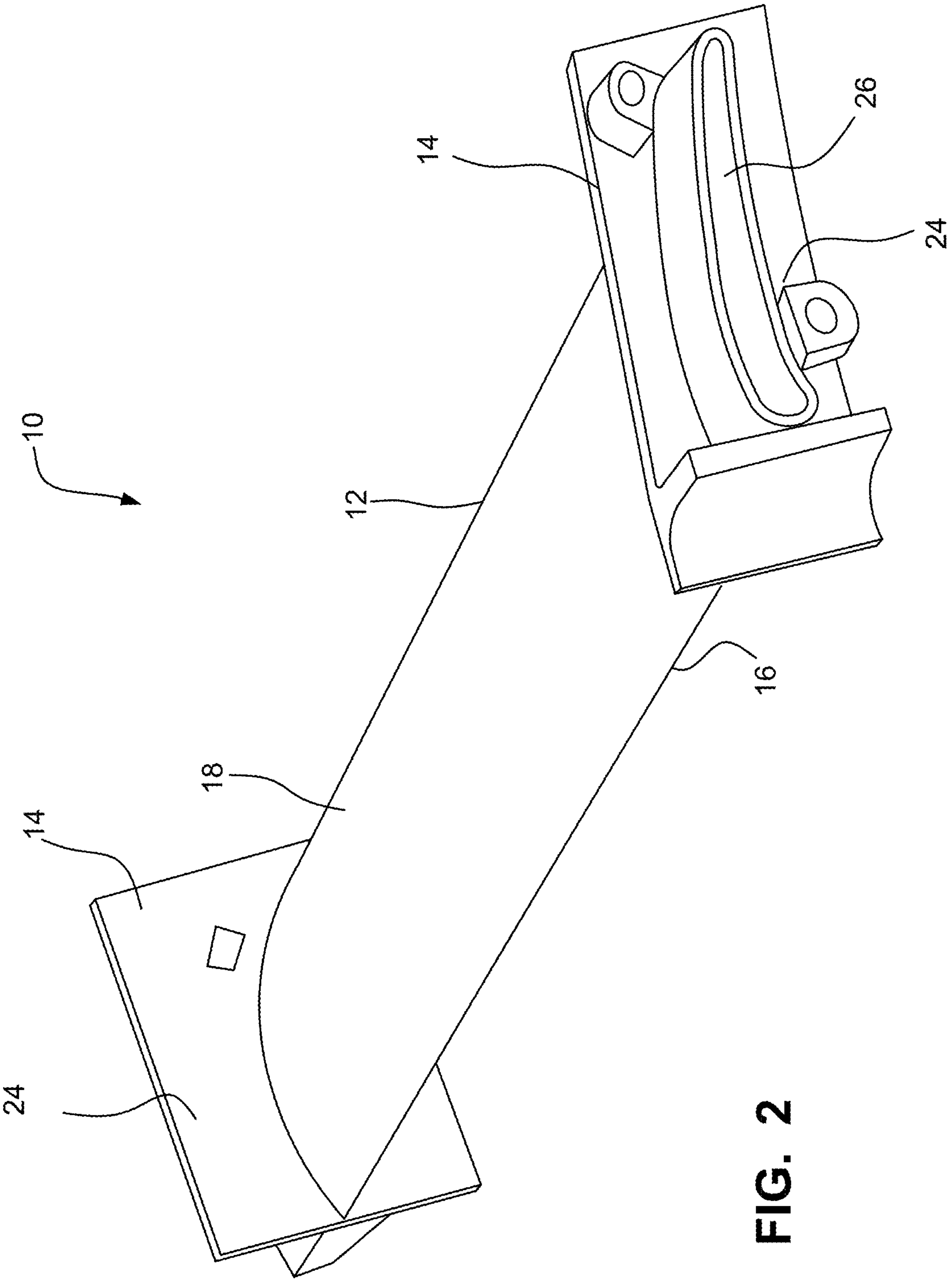
Figure 3:
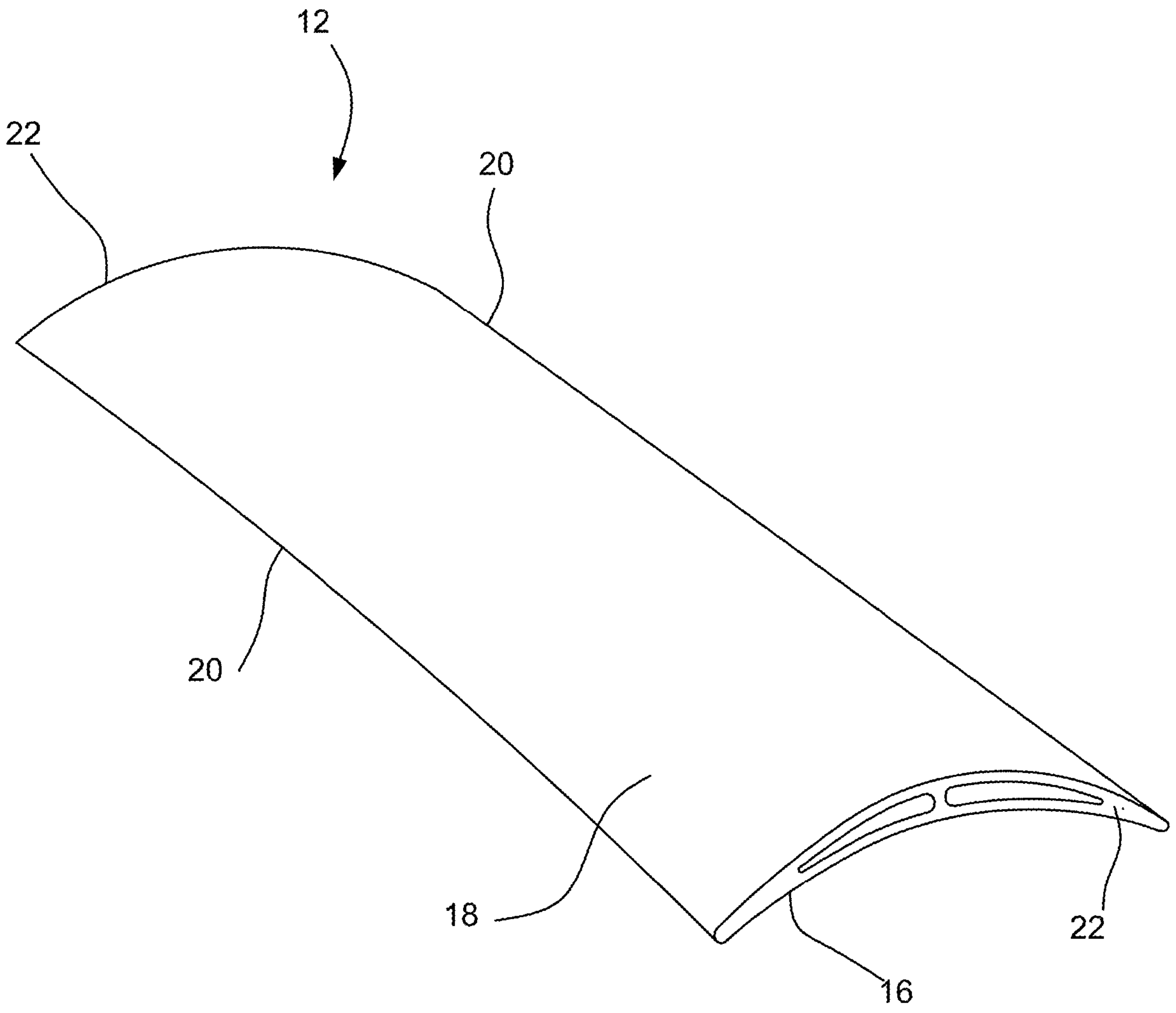
FIG. 3 is another perspective view of the main body of the exemplary turbine component without the end cap.

FIGS. 1-3 illustrate an exemplary turbine component 10 with a main body 12 and end caps 14 at each end. The turbine component 10 is illustrated as an exit guide vane with the main body 12 being in the form of an airfoil. However, the turbine component 10 is not limited to an exit guide vane and can be any component with at least one end cap 14.

The main body 12 may be made of a composite material, and the one or more end caps 14 may be made of the same material or different material (e.g., polyethylene). In addition, the one or more end caps 14 may be bonded to the main body 12 by way of a layer of urethane.

In the illustrated configuration, the main body 12 has a concave first surface 16 that extends longitudinally and is curved in a lateral direction. The main body 12 also has a convex second surface 18 that also extends longitudinally, is curved in the lateral direction, and opposes the concave first surface 16. The first and second surfaces 16 meet at opposing longitudinally extending edges 20 to form a hollow air foil shape (arcuate cross-section) with openings on opposing longitudinal ends 22.

Each end cap 14 includes a base or flange 24 and a receptacle 26. The base 24 may have a footprint that extends beyond the footprint of the main body 12. It is contemplated that the base 24 may be substantially planar. The receptacle 26 may project from the base 24 and may include a receiving space that receives a corresponding one of the longitudinal ends 22 of the main body 12. In addition, the cross-sectional shape of the receptacle 26 of the end cap 14 may be the same as the cross-section shape of the main body 12 while being slightly greater than the cross-sectional size of the main body 12. This way, the main body 12 may be tightly received within the receptacle 26.

During operation, the different parts of the turbine component 10 may wear at different rates. For example, one or both of the end caps 14 may become damaged or out of compliance with established standards (e.g., cracked, fatigued, becomes misshaped), while the main body 12 remains usable. In order to extend the useful life of the turbine component 10, the turbine component 10 may be refurbished to replace the damaged or non-compliant end cap or end caps 14 with a new undamaged end cap 14.

Figure 4:
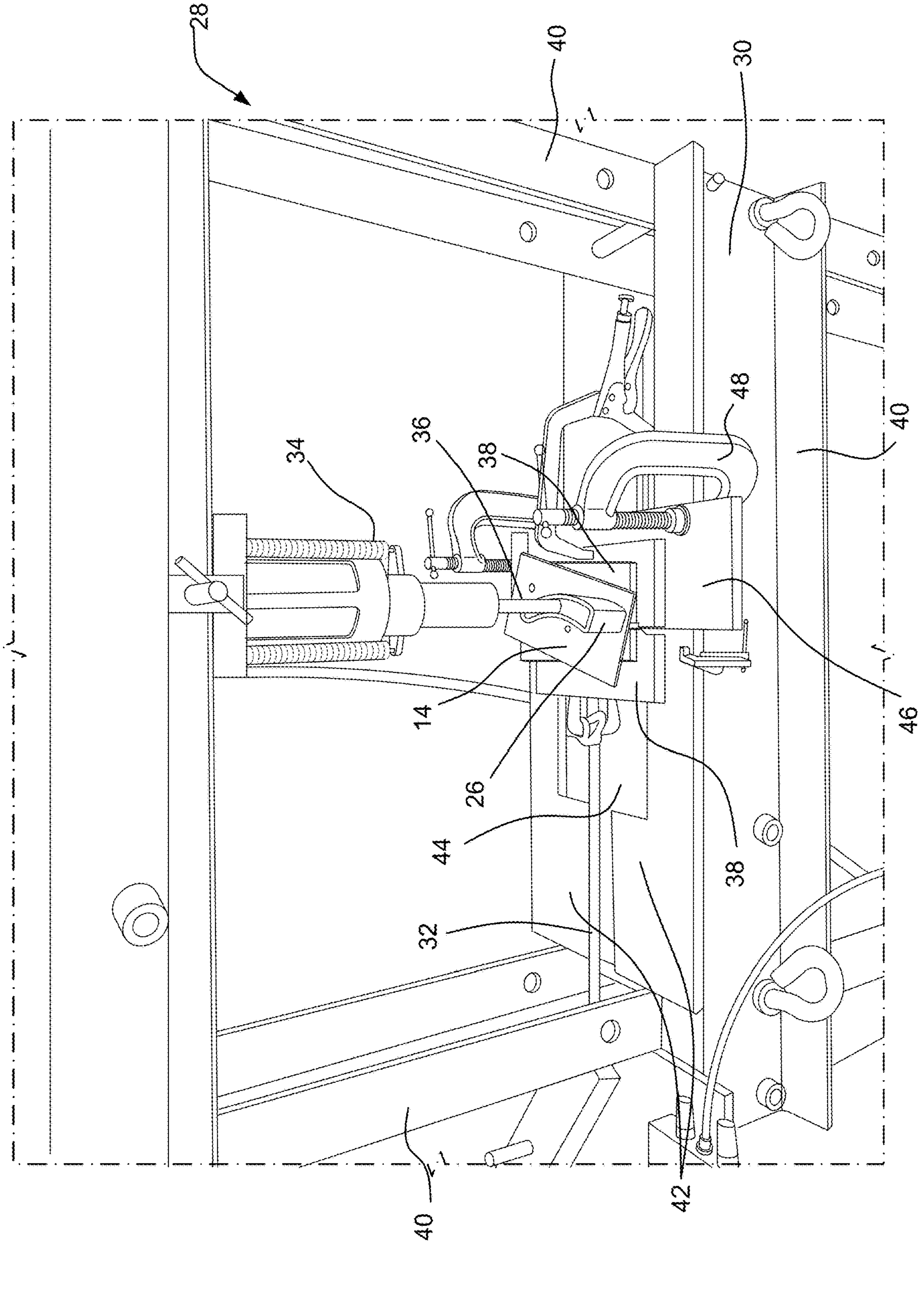
FIG. 4 is a perspective view of an exemplary extraction device.

FIG. 4 illustrates an exemplary extraction device 28 for removing an end cap 14 and the associated urethane layer from the main body 12. The extraction device 28 may include a frame 30, a compressing rod 32, an actuator 34, one or more extractors 36, and a separation tool 38.

The frame 30 may support the other components of the extraction device 28. For example, the frame 30 may include a plurality of support structures 40 in the form of beams of other structures capable of providing stability to the extraction device 28. The frame 30 may also include a supporting platform 42 that supports the separation tool 38 and by extension the turbine component 10 when the turbine component 10 is loaded onto the separation tool 38.

The supporting platform 42 may be formed from a single piece (e.g., a single plank of material) or multiple pieces (e.g., a plurality of planks positioned laterally relative to each other, and/or or multiple layers of material. In addition, the supporting platform 42 may be formed from metal, plastic, wood, composite, etc. In addition, an opening, gap, or hole 44 may be formed in a central region of the supporting platform 42. The opening 44 may be sized and shaped to receive at least a portion of the turbine component 10 when the turbine component 10 is mounted to the extraction device 28.

A cross beam 46 may may be positioned on the supporting platform 42 and may span the opening 44. The cross beam 46 may be an integrally formed or permanent part of the supporting platform 42. Alternatively, the cross beam 46 may be removable from the supporting platform 42 and may be secured to the supporting platform 42 by way of one or more securing devices 48 such as the clamps illustrated in FIG. 4. It is contemplated that the securing devices 48 may be any type of mechanical fastener able to temporarily secure the stationary plate 42 to the frame 30.

The supporting platform 42 and the cross beam 46 may together support the separating tool 38 at a particular height relative to the actuator 34 when the actuator 34 is in a pre-operation position. In this configuration, at least part of the separating tool 38 may be directly secured to the cross beam 46 and indirectly secured to the supporting platform 42 by way of the cross beam 46. In this configuration, the part of the separating tool 38 attached to the cross beam 46 may be removed from the supporting platform by removing the cross beam 46 or by removing that part of the separating tool 38 from the cross beam 46. In an alternative configuration, the cross beam 46 may be omitted, and the separating tool 38 may be secured directly to and removable from the supporting platform 42.

The compressing rod 32 may be attached to a lateral side of the frame 30 and may extend in a substantially horizontal direction. An end of the compressing rod 32 may be attached to a lateral side of one of the pieces of the separating tool 38 in such a way that moving the compressing rod 32 along its longitudinal axis moves one portion of the separating tool 38 toward or away from the other portion of the separating tool 38. It is contemplated that the compressing rod 32 may be mechanically, hydraulically, or pneumatically actuated by an actuator (not shown). In addition, the outer surface of the compressing rod 32 may be smooth or threaded or a combination of both (e.g., a first end of the compressing rod is threaded, while the other end of the compressing rod is not). Also, the compressing rod 32 may optionally have a telescoping structure in which its length increases or decreases when the compressing rod 32 is extended or retracted.

The actuator 34 may be attached to an upper portion of the frame 30, and the one or more extractors 36 may be attached to a bottom side of the actuator 34. It is contemplated that the actuator 34 may be in the form of a hydraulic ram. Alternatively, the actuator 34 may be mechanically or electrically, or pneumatically driven. The one or more extractors 36 may be in the form of a rod-shaped attachment (or other shape) that is driven toward the turbine component 10 by the actuator 34 during operation. It is contemplated that in configurations with more than one extractor 36, the each extractor 36 may have the same or a different cross-sectional shape.

The supporting platform 42, cross beam 46, and compressing rod 32 work together to hold the separation tool 38 and the turbine component 10 in place, while the actuator 34 and the one or more extractors 36 work together to press against the turbine component 10 to push the main body 12 apart from the end cap 14.

Figure 5:
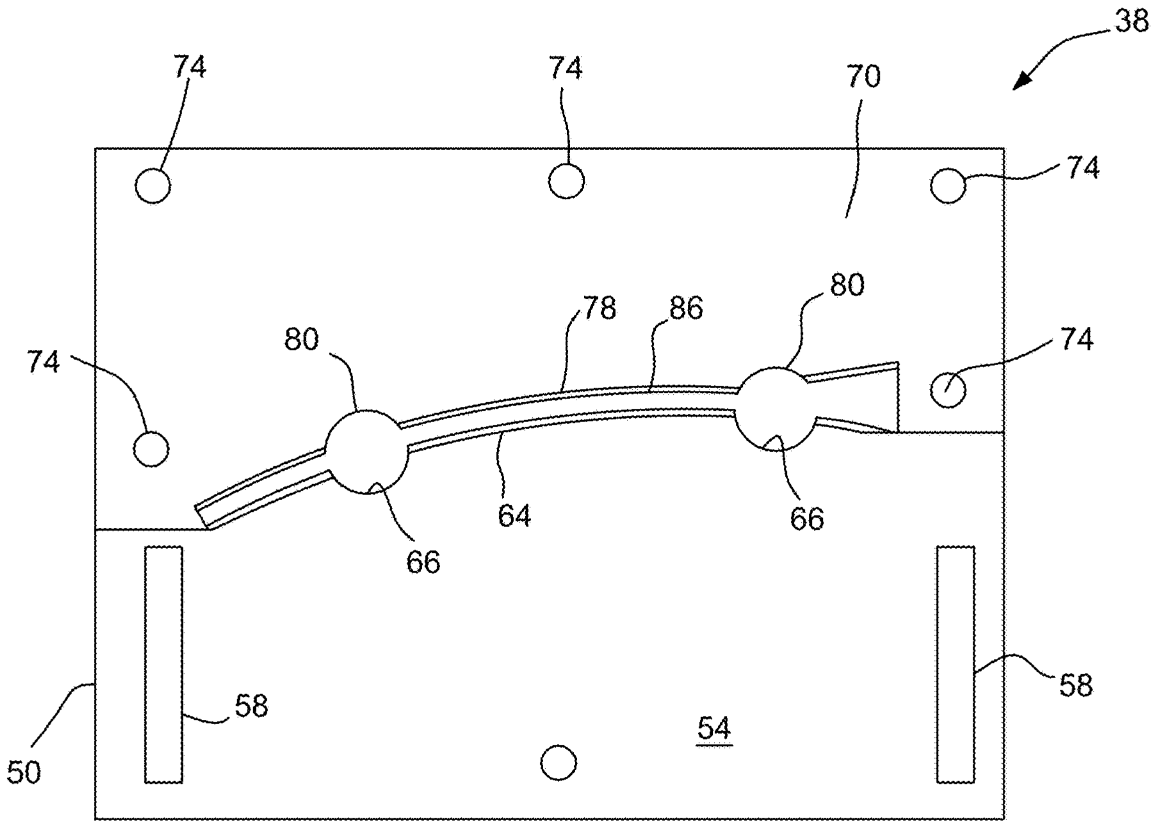
FIG. 5 is a bottom view of an extraction tool.
Figure 6:
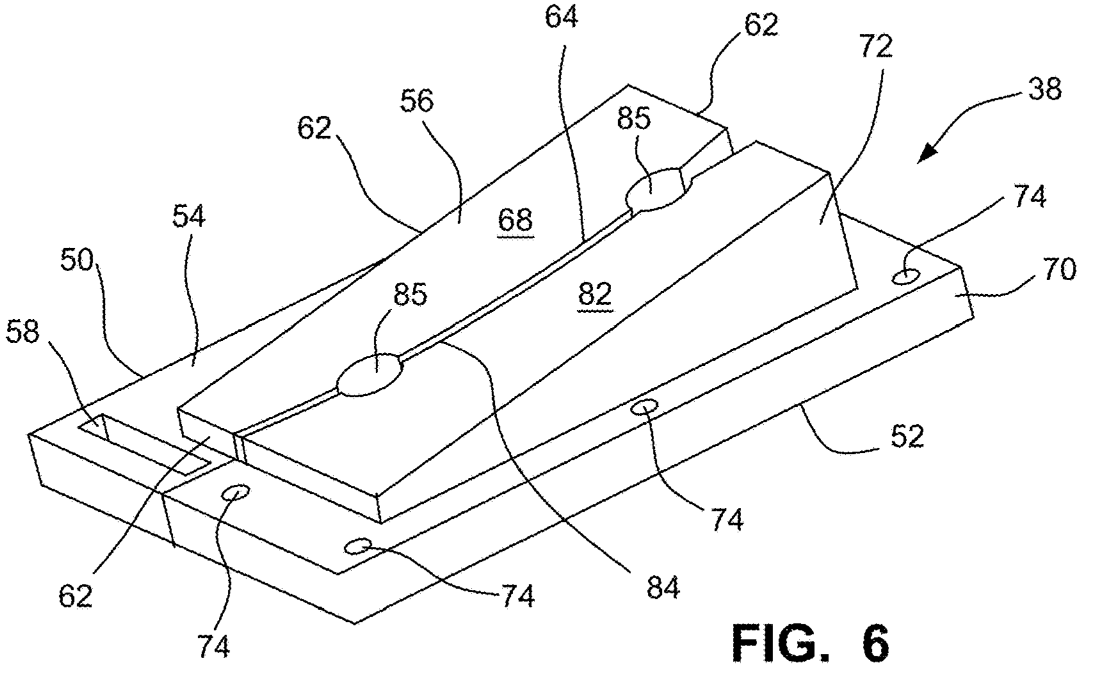
FIG. 6 is a perspective view of the extraction tool.
Figure 7:
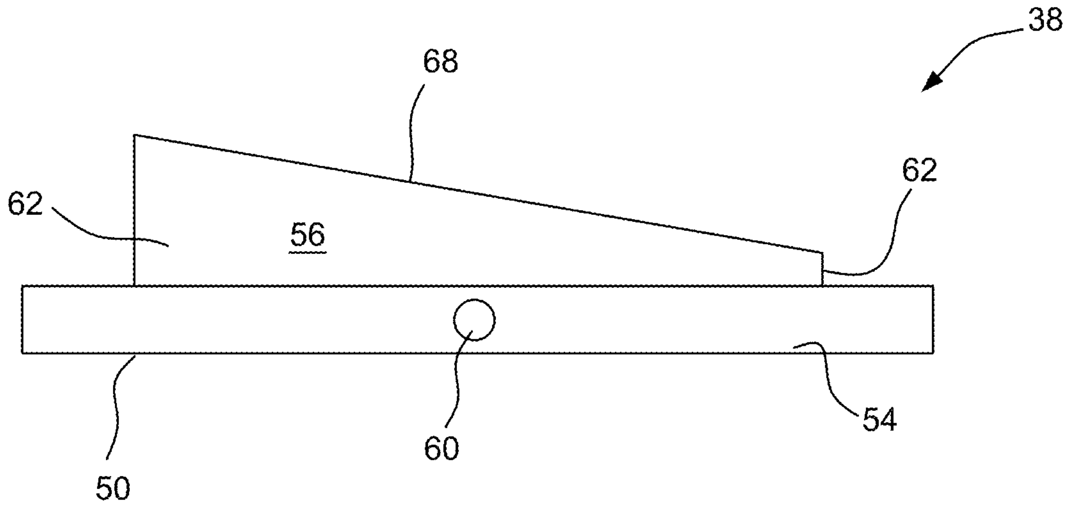
FIG. 7 is a side view of the extraction tool.

FIGS. 5-7 illustrate an exemplary separation tool 38. Each separation tool 38 may be formed from two separate components (a first part 50 and a second part 52) that together hold the turbine component 10 in place while the end cap 14 is removed from the main body 12 of the turbine component 10. During use, the first and second parts 50, 52 may be positioned in a side-by-side arrangement. In addition, the first and second parts 50, 52 may be formed from a metal, plastic, composite, wood, or any other material with enough rigidity to hold the turbine component 10 in place during processing.

The first part 50 may include a base 54 and a holding portion 56 that is positioned on the base 54. The base 54 provides a platform that supports the holding portion 56. In addition, the footprint of the base 54 may be greater than the footprint of the holding portion 56 so that a ledge, shelf, lip, or flange, is provided on three sides of the holding portion 56. To secure the first part 50 to the supporting platform 42, the base 54 may include one or more openings 58 positioned on the ledge, shelf, lip, or flange and may be configured to receive a projection from the supporting platform 42. The one or more openings 58 may be in the form of rectangular slots or other elongated shapes that allow the first part to slide or move in a lateral direction while the first part 50 is secured to the supporting platform 42. Although the openings 58 are shown to be positioned on opposite sides of the base 54, the openings 58 may be positioned in any configuration that allows the first part 50 to slide or move laterally.

In addition, as can be seen in FIG. 7, the first part 50 may include an opening 60 configured to receive the compressing rod 32. Accordingly, the first part 50 may be laterally moved by laterally moving the compressing rod 32. In particular, the compressing rod 32 may move the first part 50 of the separating tool 38 to press against the second part 52 or move away from the second part 52. It is contemplated that the hole 60 may be omitted and that the compressing rod 32 may press against a surface of the first part 50 instead of being inserted into an opening in a side wall of the first part 50.

The openings 58 of the first part 50 may be aligned so that the longer dimension of the openings 58 is oriented substantially parallel to the longitudinal axis of the compressing rod 32. Thus, the openings 58 may be configured to restrict and/or prevent movement of the first part 50 in any direction other than the direction that is substantially parallel to the longitudinal axis of the compressing rod 32.

The holding portion 56 may be in the form of a block that projects upward from the base 54 and has a plurality of vertical walls 62 with one of the vertical walls being a contoured vertical wall 64. The contoured vertical wall 64 may be substantially convex to receive the concave shape of the main body 12 of the turbine component 10. The contoured vertical wall 64 may also include one or more recesses 66. The one or more recesses 66 may be shaped to match the shape of the outer surface of the one or more extractors 36. For example, the one or more recesses 66 illustrated in FIGS. 5 and 6 are semicircular. However, the shape of the one or more recesses 66 may be different depending on the shape of the one or more extractors 36. In addition, it is contemplated that although the vertical walls 62 are shown to be planar and vertical, the vertical walls 62 may be contoured. Also, the vertical walls 62 may be angled relative to the top surface of the base 54.

The holding portion 56 may also include an upper surface 68 on which the bottom surface of the end cap 14 of the turbine component 10 may rest when the turbine component 10 is held within the separation tool 38. As can be seen in FIGS. 1-3, the bottom surface of the end cap 14 may be angled relative to the longitudinal axis of the main body 12. Accordingly, the upper surface 68 of the holding portion 56 may be angled relative to the upper surface of the base 54 so that the two vertical walls 62 adjacent to the contoured vertical wall 64 have different heights. This way, when the end cap 14 rests on the separation tool 38, the main body 12 is held in a substantially vertical orientation.

Similar to the first part 50, the second part 52 may include a base 70 and a holding portion 72 that is positioned on the base 70. The base 70 provides a platform that supports the holding portion 72. In addition, the footprint of the base 70 may be greater than the footprint of the holding portion 72 so that a ledge, shelf, lip, or flange, is provided on three sides of the holding portion 72. To secure the second part 52 to the supporting platform 42, the base 70 may include one or more openings 74 positioned on the ledge, shelf, lip, or flange and may be configured to receive a projection and/or mechanical fastener from the supporting platform 42.

Unlike the first part 50, the second part 52 may be fixed or anchored in place and may not be allowed to move during operation. Accordingly, the one or more openings 74 may be in the form of circles configured to receive a fastener.

The holding portion 72 may be in the form of a block that projects upward from the base 70 and has a plurality of vertical walls 76 with one of the vertical walls being a contoured vertical wall 78. The contoured vertical wall 78 may be substantially concave to compliment the convex shape of the main body 12 of the turbine component 10. The contoured vertical wall 78 may also include one or more recesses 80. The one or more recesses 80 may be shaped to match the shape of the outer surface of the one or more extractors 36 and may be the same shape as the one or more recesses 66 of the first part 50. For example, the one or more recesses 80 illustrated in FIGS. 5 and 6 are semicircular. However, the shape of the one or more recesses 80 may be different depending on the shape of the one or more extractors 36. In addition, it is contemplated that although the vertical walls 76 are shown to be planar and vertical, the vertical walls 76 may be contoured. Also, the vertical walls 76 may be angled relative to the top surface of the base 70.

The holding portion 72 may also include an upper surface 82 on which the bottom surface of the end cap 14 of the turbine component 10 may rest when the turbine component 10 is held within the separation tool 38. As can be seen in FIGS. 1-3, the bottom surface of the end cap 14 may be angled relative to the longitudinal axis of the main body 12. Accordingly, the upper surface 82 of the holding portion 72 may be angled relative to the upper surface of the base 72 so that the two vertical walls 76 adjacent to the contoured vertical wall 78 have different heights. This way, when the end cap 14 rests on the separation tool 38, the main body 12 is held in a substantially vertical orientation.

As can be seen in FIG. 5, the base 70 of the second part 52 may extend past the contoured vertical wall 78 so that when the first and second parts 50, 52 are pressed against each other, a gap remains between the two contoured vertical walls 64, 78. It is contemplated that the base 54 of the first part 50 may extend beyond the contoured vertical wall 64 instead of the base 70 extending beyond the contoured vertical wall 78. Alternatively, both bases 54, 70 may extend beyond their respective contoured vertical walls 64, 78. Any configuration may be used as long as a gap between the contoured vertical walls 64, 78 is maintained when the first and second parts 50, 52 are pressed together. In other words, when the first and second parts 50, 52 are pressed together, the bases 54, 70 may contact each other, while the holding portions 56, 72 remain separated.

The resulting gap between the first and second parts 50, 52 may extend all the way through separation tool 38 so that the main body 12 of the turbine component 10 can extend downward below the separation tool 38. When the separation tool 38 supports the turbine component 10, the end cap 14 may rest on the upper surfaces 68, 82, while the main body 12 may extend through the gap 84. The gap 84 may have a convex side and a concave side to match the contour of the main body 12 and hold the main body 12 snuggly. Also, the one or more recesses 66, 80 may form enlarged spaces 85 in the gap 84 that are large enough for a respective one of the one or more extractors 36 to pass through.

The gap 84 may also include a tapered portion on one or both sides in which the width of the gap is greater toward an end of the gap 84 and narrows toward a central region of the gap 84.

Figure 8:
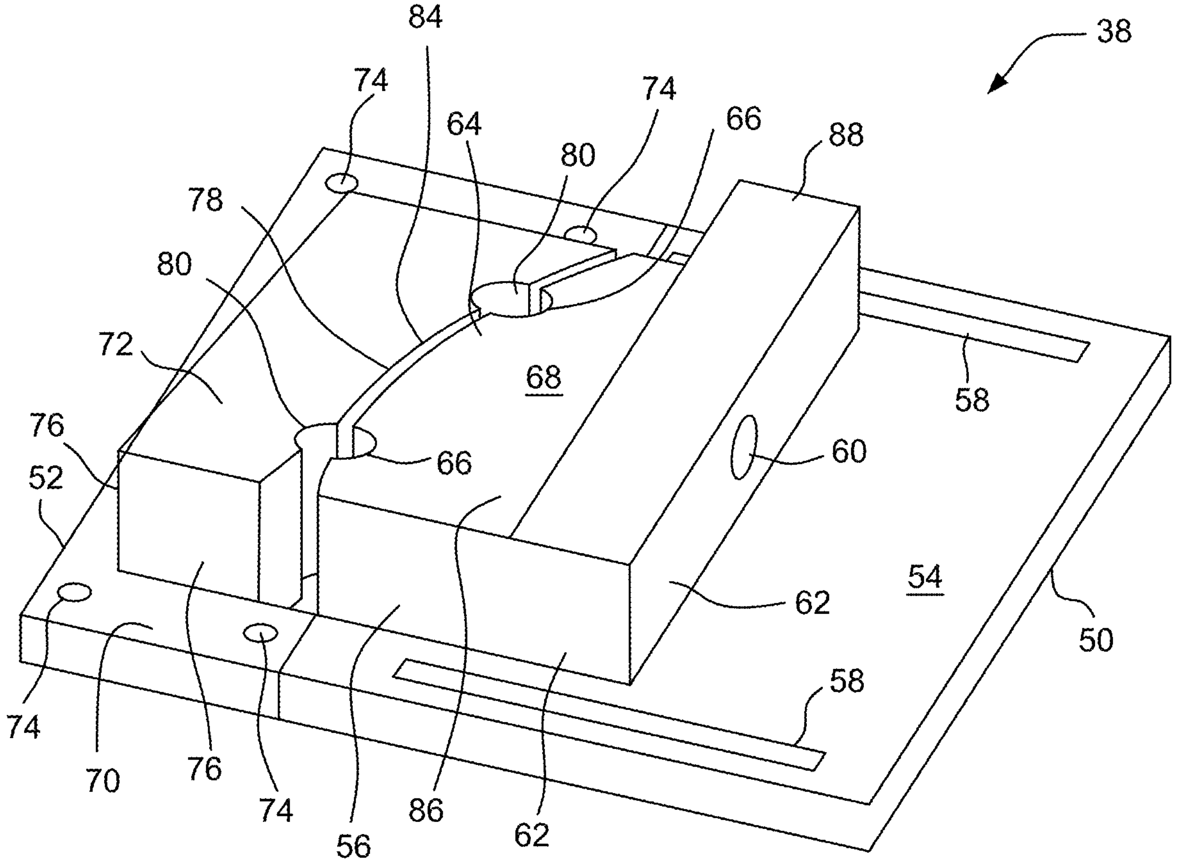
FIG. 8 is a perspective view of another exemplary extraction tool.

FIG. 8 shows an alternative configuration in which the upper surface 68 of the holding portion 56 of the first part 50 has an inclined portion 86 and a substantially level portion 88. The inclined portion 86 may support the end cap 14 of the turbine component 10 and extend to the contoured vertical wall 64 (similar to the configurations in FIGS. 5-7). The substantially level portion 88 of the upper surface 68 may extend to the vertical wall 62 with the opening 60. This configuration may allow the substantially level portion 88 to provide lateral stability to the turbine component 10. In particular, there may be a vertical wall between the inclined portion 86 and the substantially level portion 88 against which the end cap 14 may abut when supported by the upper surfaces 68, 82.

A method for using the extraction device 28 and the separation tool 38 to separate the main body 12 from an end cap 14 will now be disclosed. The process may begin by resetting or verifying that the extraction device 28 is reset to a pre-operation or loading condition. This may involve moving the compressing rod 32 and the actuator 34 and the one or more extractors 36 to their pre-operation positions so that there is enough space within the operating space of the extraction device 28 for the turbine component 10 to be loaded onto the extraction device 28.

In the pre-operation position, the compressing rod 32 may be retracted to its fullest extent or at least retracted a distance to provide enough space for the separation tool 38 and the turbine component 10 to be loaded onto the extraction device 28. In the configuration illustrated in FIG. 4, the fullest extent of retraction for the compressing rod 32 is toward the left side of the frame 30. However, the location of the base of the compressing rod 32 (the location from which the compressing rod 32 extends and retracts) is not limited to the left side and may be located on any lateral side of the frame 30. It should also be understood that the compressing rod 32 may have a fixed length so that retracting and extending the compressing rod 32 moves the entire compressing rod 32 into and out of the frame 30. Alternatively, the compressing rod 32 may have a telescoping structure so that retracting the compressing rod 32 reduces the length of the compressing rod 32 and extending the compressing rod 32 increases the length of the compressing rod 32.

In the pre-operation position, the actuator 34 and the one or more extractors 36 may be positioned in their uppermost positions or at least retracted a distance to provide enough space for the separation tool 38 and turbine component 10 to be loaded onto the extraction device 28.

With respect to the separation tool 38, it is in a pre-operation or loading position when the first and second parts 50, 52 are separated from each other and the second part 52 is positioned on the supporting platform 42. In the pre-operation position, the first part 50 may be removed from the entire extraction device 28. Alternatively, the first part 50 of the separation tool 38 may be attached to the compressing rod 32 so that when the compressing rod 32 is retracted, the first part 50 is also moved laterally away from the second part 52.

The second part 52 may be positioned on the supporting platform 42 beneath the actuator 34 and the one or more extractors 36. It is contemplated that the second part 52 may be permanently attached to the extraction device 28 or may be removable from the extraction device 28. Either way, the pre-operation or loading position of the second part 52 of the separation tool 38 is beneath the actuator 34 and the one or more extractors 36.

Once the extraction device 28 is verified to be in the pre-operation or loading position, the turbine component 10 may be loaded onto the second part 52 of the separation tool 38. This may be achieved by positioning the flange 24 of the end cap 14 onto the upper surface 82 of the second part 52 so that the main body 12 is adjacent to the contoured vertical wall 78 of the second part 52. The turbine component 10 should be oriented so that the concave surface 16 faces or abuts the contoured vertical wall 78 of the second part 52 (if the contoured vertical wall 78 is concave, then the convex surface 18 of the main body 12 should face or abut the vertical wall 78).

Depending on the weight distribution of the turbine component 10, the turbine component 10 may be able to balance on the second part 52 so that the turbine component 10 can be supported on the second part 52 without any additional help. However, if the turbine component 10 cannot be supported on the second part 52 without help, an operator may manually hold the turbine component 10 in place (either by hand or by using another tool) until the first part 50 is moved into an extraction position next to the second 52 and the turbine component 10 can be supported on the extraction tool 38 without outside help.

Once the turbine component 10 is loaded onto the second part 52 of the separation tool 38, the first part 50 may be moved next to the second part 52 so that the flange 24 of the end cap 14 also rests on the upper surface 68 of the first part 50 and one of the surfaces 16, 18 of the main body 12 faces or abuts the contoured vertical wall 64 of the first part 50.

The first part 50 may be moved into position by actuating the compressing rod 32 to move laterally toward the second part 52 of the extraction tool 38. Because the compressing rod 32 is inserted into the opening 60 on the side of the first part 50, moving or expanding the compressing rod 32 toward the second part 52 will also move the first part 50 toward the second part 52. It should be understood that if the first part 50 of the extraction tool 38 is initially separated from the compressing rod 32, the first part 50 must first be connected to the compressing rod 32 before actuating the compressing rod 32.

Also, it is contemplated that the first part 50 may lack an opening 60 and that the compressing rod 32 may merely abut the side of the first part 50 instead of being inserted into an opening in the first part 50. It is further contemplated that other devices may be employed to move the first part 50 toward the second part 52. For example, the first part may be moved manually by hand or by another tool as long as the tool or user's hand can maintain the first part 50 in place during the extraction process.

Once the first part 50 of the extraction tool 38 is positioned in an extracting position next to the second part 52, the first and second parts 50, 52 may hold the turbine component 10 in place. In this position, the extraction tool 38 may support the end cap 14 from below while providing no support beneath the main body 12. Accordingly, the extraction tool 38 may prevent the end cap 14 from moving downward while allowing a downward movement of the main body 12 when the end cap 14 is separated from the main body 12.

In addition, the first and second parts 50, 52 of the extraction tool 38 may, at least prior to the extraction process, prevent or minimize lateral movement (linear and rotational) of the turbine component 10. This may be achieved by applying a compressive force against the concave and convex surfaces 16, 18 by way of the contoured vertical walls 64, 78 of the extraction tool 38. The second part 52 of the extraction tool 38 may resist lateral movement of the turbine component by being fixed or anchored in place on the extraction device 28. The first part 50 of the extraction tool 38 may resist lateral movement of the turbine component by way of a compressive force generated within the compression rod 32 that is transmitted through the first part 50.

Once the turbine component 10 is loaded onto the extraction tool 38, the extraction tool 38 may be aligned with the one or more extractors 36. The extraction tool 38 is aligned with the one or more extractors 36 when each of the enlarged spaces 85 in the gap 84 is directly below a respective one of the one or more extractors 36. Laterally moving the extraction tool 38 (either manually or automatically) may align the extraction tool 38 with the one or more extractors 36 and may be achieved by laterally moving the supporting platform 42, laterally moving the compressing rod 32, and/or laterally moving the actuator 34.

Alternatively, the location at which the second part 52 of the extraction tool 38 is anchored to the frame 30 may automatically align the extraction tool 38 with the one or more extractors 36. In this configuration, simply loading the turbine component 10 onto the extraction tool 38 automatically aligns the extraction tool 38 with the one or more extractors 36.

Once the extraction tool 38 is aligned with the one or more extractors 36, the actuator 34 may be activated to move the one or more extractors 36 downward toward the turbine component 10. Upon reaching the end cap 14 of the turbine component 10, the one or more extractors 36 may enter the receptacle 26 of the end cap 14. This way, the one or more extractors 36 may pass through the end cap 14 so that the one or more extractors 36 do not press down on the end cap 14 during operation.

The one or more extractors 36 may continue to move downward until the one or more extractors 36 come into contact with an edge of the main body 12. Upon contacting the main body 12, the one or more extractors 36 may push or force the main body 12 in a downward direction. However, during the downward push, the upper surfaces 68, 82 of the extraction tool 38 may prevent the end cap 14 from moving downward, while the receptacles 85 may allow the one or more one or more extractors 85 to move through the extraction tool 38. This may cause a separating force that breaks the bond between at least some of the urethane and the main body 12 so that the main body 12 becomes separated from the end cap 14 as the one or more extractors 36 continue to move downward.

Once the main body 12 has been separated from the end cap 14, the first part 50 of the extraction tool 38 may be moved away from the second part 52 (e.g., by retracting or laterally moving the compressing rod 32) to release the end cap 14 and the main body 12 from the extraction tool 38. In addition, any urethane remaining on the main body 12 may be removed by sanding, buffing, scraping, or any other method that may removed the remnants of a coating from the main body 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Also, the terms "approximately", "about", and "substantially" encompass a range of plus or minus 15%. Furthermore, characteristics or steps which have been described may also be used in combination with other characteristics or steps and in any order unless the disclosure or context suggests otherwise.

The invention claimed is:

1. A separation tool configured to extract an end cap from a main body of a turbine component, the separation tool comprising:

a first body with a first base and a first holding portion that projects from the first base; and a second body with a second base and a second holding portion, wherein both of the first and second holding portions are configured to engage the end cap of the turbine component, wherein the first and second bodies are separable from each other and are configured to form a contoured gap when the first and second bodies are positioned against each other in a side-by-side configuration, and wherein the first and second bodies are configured so that when the first and second bodies are brought together, a first side wall of the gap is convex and a second side wall of the gap opposing the first side wall is concave.

2. The separation tool of claim 1, wherein the gap comprises one or more regions in which the gap is wider than in other regions.

3. The separation tool of claim 1, wherein at least a portion of an upper surface of the first holding portion and at least a portion of an upper surface of the second holding portion are inclined in the same direction when the first and second bodies are positioned against each other in the side-by-side configuration.

4. The separation tool of claim 1, wherein the first base has a larger footprint than the first holding portion and forms a lip or flange around the first holding portion.

5. The separation tool of claim 4, wherein the second base has a larger footprint than the second holding portion and forms a lip or flange around the second holding portion.

6. The separation tool of claim 1, wherein the first holding portion comprises a first contoured substantially vertical wall, the second holding portion comprises a second contoured substantially vertical wall, and the first and second contoured substantially vertical walls are configured to face each other to form the gap when the first and second bodies are brought together in the side-by-side configuration.

7. An extraction device configured to extract a main body of a turbine component from an end cap, the extraction device comprising:

an actuator;

one or more extractors attached to the actuator;

and the separation tool of claim 1.

8. The extraction device of claim 7, wherein the actuator is configured to move the one or more extractors toward the separation tool so that the one or more extractors applies a downward force against the main body of the turbine component while the separation tool prevents the end cap from moving downward.

9. The extraction device of claim 7, wherein the first body of the separation tool is laterally movable toward and away from the second body of the separation tool, while the second body of the separation tool is anchored to a frame of the extraction device.

10. The extraction device of claim 9, further comprising a rod configured to move the first body of the separation tool toward and away from the second body of the separation tool.

11. A separation tool configured to extract an end cap from a main body of a turbine component, the separation tool comprising:

a first body with a first substantially planar base and a first block that projects from the first base, a footprint of the first planar base extending beyond a footprint of the first block; and a second body with a second substantially planar base and a second block that projects from the second base, a footprint of the second base extending beyond a footprint of the second block, wherein the first and second bodies are configured to be joined together in a side-by-side arrangement in which the first and second bases engage each other to prevent the first and second blocks from coming into contact with each other so that a gap remains between the first and second blocks when the first and second bodies are joined together, and wherein the gap between the first and second blocks is curved in a lateral direction.

12. The separation tool of claim 11, wherein a width of the gap varies in a lateral direction.

13. The separation tool of claim 11, wherein the first block has a first wall, the second block has a second wall, the first and second walls are configured to face each other and form opposite sides of the gap when the first and second bodies are joined together, and wherein one of the first and second walls is concave and the other of the first and second walls is convex.

14. The separation tool of claim 13, wherein the first and second walls are substantially vertical.

15. The separation tool of claim 13, wherein each of the first and second walls comprises at least one recess.

16. The separation tool of claim 15, wherein the at least one recess on the first wall is positioned to oppose the at least one recess on the second wall when the first and second bodies are joined together.

17. The separation tool of claim 11, wherein at least a portion of an upper surface of the first block and at least a portion of an upper surface of the second block are inclined in the same direction when the first and second bodies are joined together in the side-by-side configuration.

18. An extraction device configured to extract a main body of a turbine component from an end cap, the extraction device comprising:

a frame;

an actuator attached to the frame;

one or more extractors attached to the actuator, the actuators being movable relative to the frame;

and the separation tool of claim 11, wherein the one or more extractors are configured to pass between the first and second bodies of the separation tool when the first and second bodies are joined together.

19. The extraction device of claim 18, wherein, the separation tool is configured to hold the turbine component so that at least a portion of the main body of the turbine component is located within gap between the first and second bodies of the separation tool, and an end cap of the turbine component rests on the first and second blocks of the separation tool.

20. The extraction device of claim 19, wherein, the actuator is configured to move the one or more extractors to apply a downward force against the turbine component while the main body of the turbine component is held between the first and second bodies the separation tool, and wherein the first and second bodies of the separation tool are configured to prevent the end cap of the turbine component from moving downward while at the same time allowing the main body of the turbine component to pass between the first and second bodies of the separation tool.

* * * * *